(12) United States Patent
Xiang et al.

(10) Patent No.: US 10,166,516 B2
(45) Date of Patent: Jan. 1, 2019

(54) CONTROL METHOD AND CONTROL SYSTEM FOR AGITATING MECHANISM

(71) Applicant: Johnson Electric S.A., Murten (CH)

(72) Inventors: You Qing Xiang, Hong Kong (CN); Shi Wen Wang, Hong Kong (CN); Lian Zhong Zhang, Hong Kong (CN); Yui Ko Wong, Hong Kong (CN)

(73) Assignee: JOHNSON ELECTRIC S.A., Murten (CH)

( * ) Notice: Subject to any disclaimer, the term of this patent is extended or adjusted under 35 U.S.C. 154(b) by 56 days.

(21) Appl. No.: 15/220,887

(22) Filed: Jul. 27, 2016

(65) Prior Publication Data

US 2017/0036183 A1 Feb. 9, 2017

(30) Foreign Application Priority Data

Aug. 4, 2015 (CN) .......................... 2015 1 0472780

(51) Int. Cl.
*B01F 15/00* (2006.01)
*G05B 15/02* (2006.01)
*A47J 43/07* (2006.01)

(52) U.S. Cl.
CPC ....... *B01F 15/00389* (2013.01); *A47J 43/075* (2013.01); *B01F 15/00201* (2013.01); *G05B 15/02* (2013.01); *B01F 2015/00642* (2013.01)

(58) Field of Classification Search
CPC .......... B01F 15/00389; B01F 15/00201; A47J 43/075

See application file for complete search history.

(56) References Cited

U.S. PATENT DOCUMENTS

| 4,451,187 A * | 5/1984 | Ishikawa ................ B23Q 11/04 408/11 |
| 5,293,760 A * | 3/1994 | Tani ...................... D06F 39/003 68/12.02 |
| 6,405,662 B1 * | 6/2002 | Williams ................ F23G 5/033 110/101 CF |
| 8,360,349 B1 * | 1/2013 | Sotsky .................. B02C 13/286 241/33 |
| 2002/0176320 A1 * | 11/2002 | Wulf ..................... A47J 43/042 366/205 |

(Continued)

*Primary Examiner* — Vincent H Tran
(74) *Attorney, Agent, or Firm* — Muncy, Geissler, Olds & Lowe, P.C.

(57) ABSTRACT

A control method and control system for an agitating mechanism are provided. The control method includes receiving a load current detected by a current detecting apparatus when the agitating mechanism is rotating along a specific direction; determining whether the rotation of the agitating mechanism meets a preset trigger condition based on the load current; and controlling the agitating mechanism to rotate in a direction opposite from the specific direction when the trigger condition is met. The present invention can reduce the possibility of the electrical components of the agitating mechanism being burnt out and prolong the lifespan of the agitating mechanism. The present invention can improve agitation results of the agitating mechanism. At low speed, the agitating mechanism can perform the agitation gently without damaging the texture of the solid food. At high speed, the agitating mechanism can more homogeneously and finely agitate the mushy food with enhanced agitating efficiency.

9 Claims, 9 Drawing Sheets

(56) References Cited

U.S. PATENT DOCUMENTS

| | | | |
|---|---|---|---|
| 2004/0030444 A1* | 2/2004 | Hieb | G07F 9/026 700/236 |
| 2010/0147593 A1* | 6/2010 | Hariharan | E21B 21/001 175/66 |
| 2010/0269857 A1* | 10/2010 | Assmann | A47L 9/0411 134/6 |
| 2012/0056025 A1* | 3/2012 | Nybo | B02C 18/0092 241/25 |
| 2013/0031927 A1* | 2/2013 | Shinohara | F25C 5/005 62/320 |
| 2015/0217296 A1* | 8/2015 | Lowe | B02C 9/04 241/25 |
| 2017/0036183 A1* | 2/2017 | Xiang | B01F 15/00389 |

* cited by examiner

CONTROL METHOD AND CONTROL SYSTEM FOR AGITATING MECHANISM

CROSS REFERENCE TO RELATED APPLICATIONS

This non-provisional patent application claims priority under 35 U.S.C. § 119(a) from Patent Application No. 201510472780.4 filed in The People's Republic of China on Aug. 4, 2015.

FIELD OF THE INVENTION

The present invention relates to method and system for controlling a rotation process of an agitating mechanism such as a food mixer, and in particular to the control of a motor-driven food mixer.

BACKGROUND OF THE INVENTION

A known agitating mechanism, such as the agitating mechanism of a food mixer, rotates in a fixed single direction, or can be direction-reversed. However, the direction reverse is achieved either by manual trigger or according to a fixed time period.

In real life, when some agitating mechanisms are used to agitate blocky solid food such as vegetables and meat blocks, or food containing the solid blocks, agitating blades of the agitating mechanism may be resisted by the blocks. The agitating mechanism usually operates with a preset or user-selected power which is constant. When the agitating blades are resisted by the solid blocks, the rotation speed becomes very slow or even the agitating mechanism becomes stalled which is referred to as being jammed. If the jam lasts a little long, it may cause the agitating mechanism (e.g. the motor) or other electrical components to be burnt out. Even if the agitating blades of the agitating mechanism forcefully breaks through the resistance of the solid blocks, this over-forceful driving manner can seriously damage the texture of the food being agitated, which reduces visual enjoyability of the food, affects user's appetite, degrades the user experience, and shortens the life of the agitating mechanism.

Some other agitating mechanisms are used to agitate mushy and viscous food such as milkshake or salad, and usually ice blocks are added to the food to be agitated at the same time. During agitation, high rotation speed agitating blades (cutter blades) form a blocking layer, which makes the viscous food unable to be sufficiently agitated and always remain above the blocking layer of the cutter blades. As such, a cavity is formed in the agitated substance at the area of the blocking layer, which looks like an air bubble in the agitated substance. The cavity does not hinder the agitation of the agitating mechanism. However, the cavity makes the substance unable to be homogenously agitated, such that fine agitation cannot be achieved, which can easily result in lumps being formed in the agitated substance.

SUMMARY OF THE INVENTION

Thus, there is a desire for a control method and a control system for an agitating mechanism which can address at least one of the forgoing problems.

In one aspect, a control method for an agitating mechanism is provided. The control method includes:

an electrical current obtaining step s1 of receiving a load current detected by a current detecting apparatus when the agitating mechanism is rotating along a specific direction;

a trigger determination step s2 of determining whether the rotation of the agitating mechanism meets a preset trigger condition based on the load current; and a rotation control step s3 of controlling the agitating mechanism to rotate in a direction opposite from the specific direction when the trigger condition is met.

In another aspect, a control system for the agitating mechanism is provided, which includes:

an electrical current obtaining module configured to receive a load current detected by a current detecting apparatus when the agitating mechanism is rotating along a specific direction;

a trigger determination module configured to determine whether the rotation of the agitating mechanism meets a preset trigger condition based on the load current; and a rotation control module configured to control the agitating mechanism to rotate in a direction opposite from the specific direction when the trigger condition is met.

The present invention has the following advantages: the present invention can automatically reverse the direction according to actual situations during the agitating operation and can therefore handle special situations by itself; the present invention can reduce the possibility of the electrical components of the agitating mechanism being burnt out and prolongs the lifespan of the agitating mechanism; the present invention can prevent the texture of solid food from being damaged and can more homogeneously and finely agitate the mushy food. The present invention can improve the agitation results of the agitating mechanism. At low speed, the agitating mechanism can perform the agitation gently without damaging the texture of the solid food. At high speed, the agitating mechanism can more homogeneously and finely agitate the mushy food with enhanced agitating efficiency.

DETAILED DESCRIPTION OF THE PREFERRED EMBODIMENTS

Below, embodiments of the present invention will be described in greater detail with reference to the drawings.

Referring to FIG. 1 through FIG. 6, the present invention provides a control method for an agitating mechanism. The main technical solution of the control method includes:

step s1 which is an electrical current obtaining step of receiving a load current detected by a current detecting apparatus when the agitating mechanism is rotating along a specific direction;

step s2 which is a trigger determination step of determining whether the rotation of the agitating mechanism meets a preset trigger condition based on the load current; and step s3 which is a rotation control step of controlling the agitating mechanism to rotate in a direction opposite from the specific direction when the trigger condition is met.

Several embodiments of the control method of the present invention will be described below based on the above main technical solution.

Based on the above main technical solution, the present invention provides the following first to fourth embodiments to deal with the situation that the rotation of the agitating mechanism is jammed.

Figure 3:
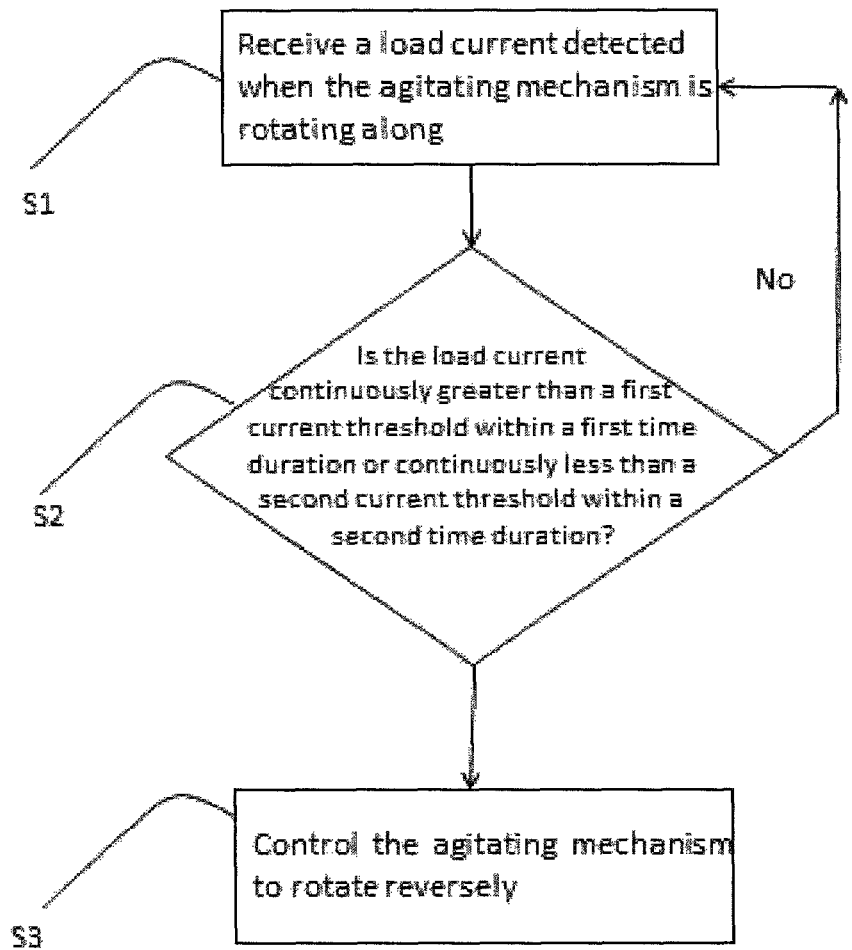

In the first embodiment of the control method of the present invention, whether jam occurs is determined based on the load current. Referring to FIG. 3, in this embodiment, the trigger determination step s2 includes a trigger judgment step s21 which refers in particular to jam determination in which whether the rotation of the agitating mechanism meets the trigger condition is determined directly based on the load current. The trigger condition is that the load current is continuously greater than a preset first current threshold within a preset first time duration.

Figure 4:
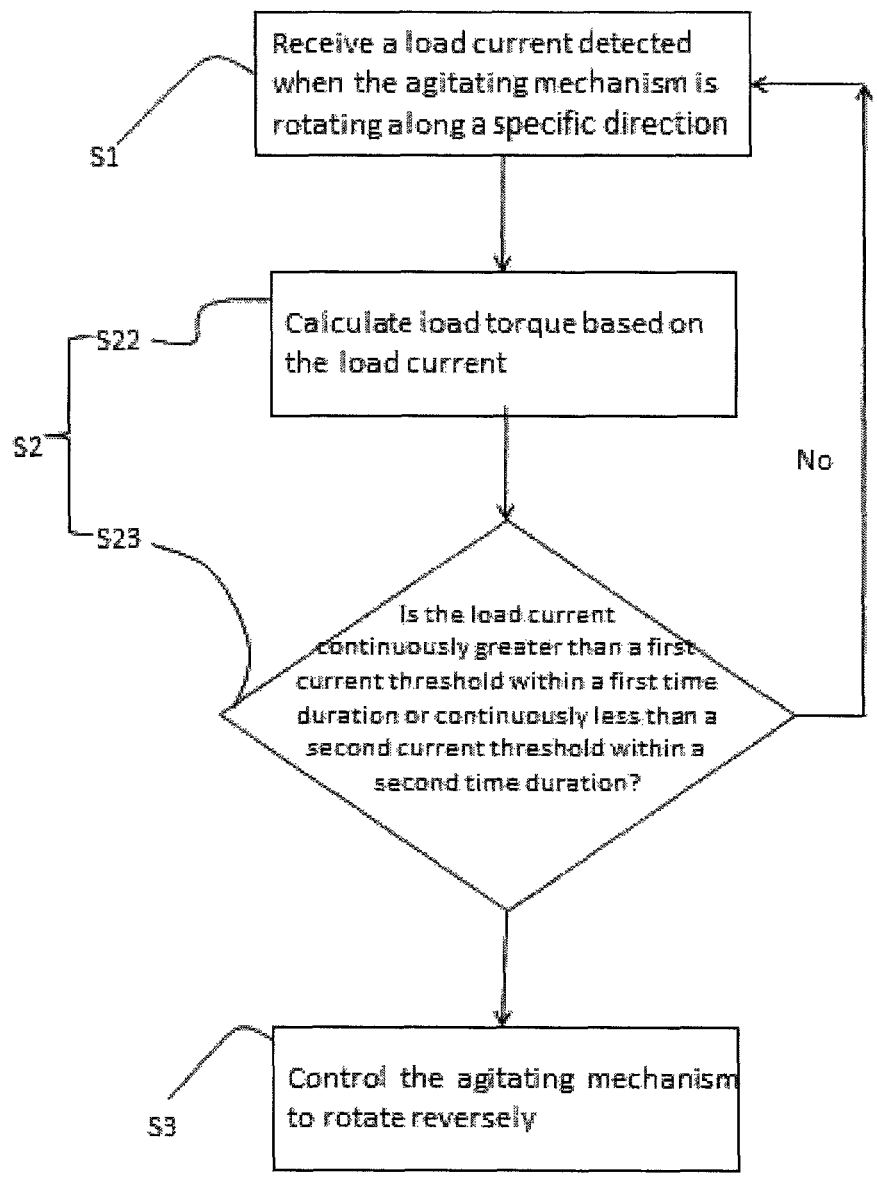

In the second embodiment of the control method of the present invention, whether jam occurs is determined based on a load torque. Referring to FIG. 4, in this embodiment, the trigger determination step s2 includes:

a torque calculation step s22 of calculating the load torque based on the load current; and a trigger judgment step s23 of determining whether the rotation of the agitating mechanism meets the trigger condition based on the load torque, wherein the trigger condition is that the load torque is continuously greater than a preset first torque threshold within a preset third time duration, and wherein the first torque threshold is less than a rated maximum output torque of the agitating mechanism.

Figure 5:
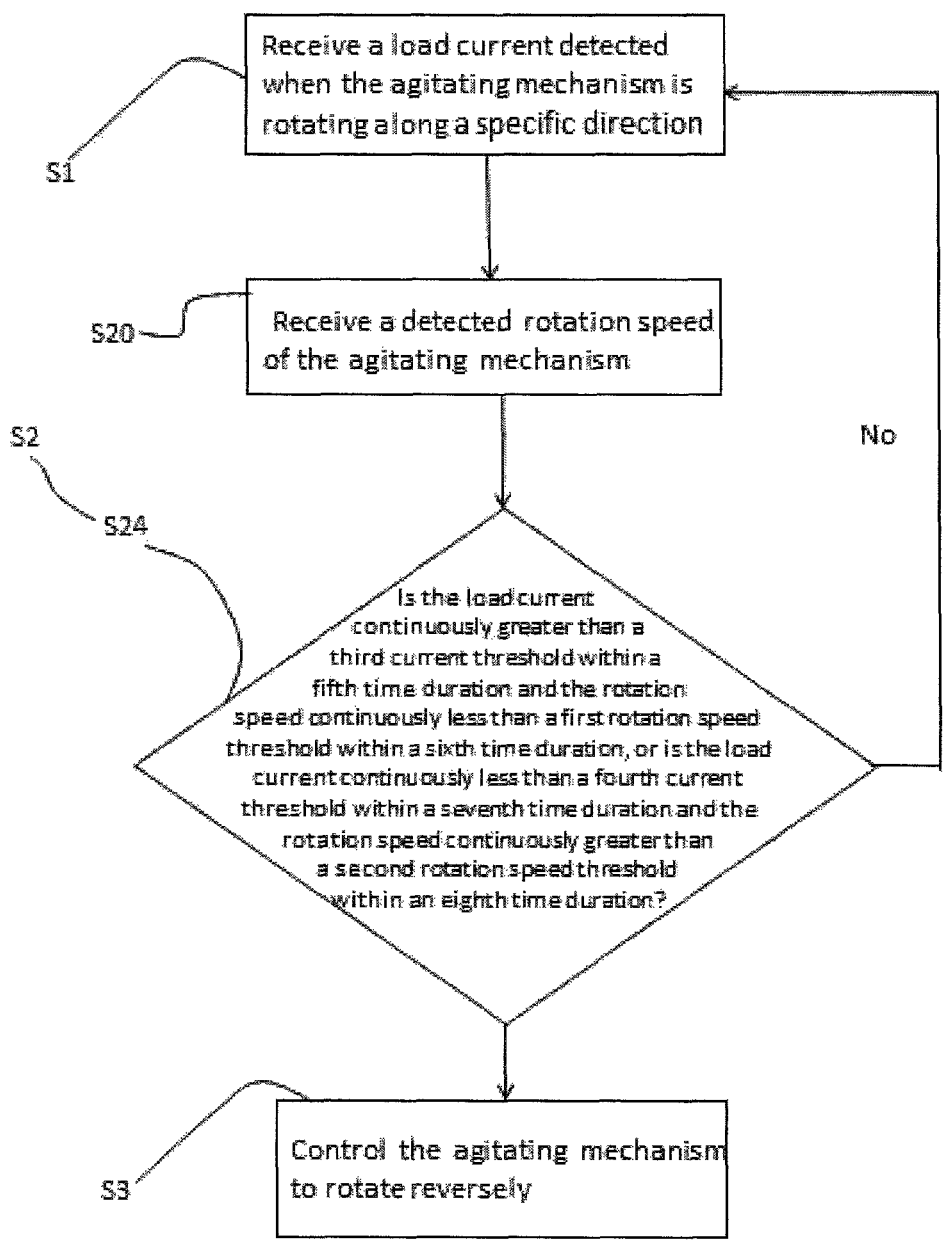

In the third embodiment of the control method of the present invention, whether jam occurs is determined based on the load current and a rotation speed of the agitating mechanism. Referring to FIG. 5, in addition to the above main technical solution, this embodiment further includes:

a speed obtaining step s20 of receiving a rotation speed of the agitating mechanism that is detected by a speed detecting apparatus;

the trigger determination step s2 including a trigger judgment step s24 of determining whether the rotation of the agitating mechanism meets the trigger condition based on the load current and the rotation speed, wherein the trigger condition is that the load current is continuously greater than a preset third current threshold within a preset fifth time duration and the rotation speed is continuously less than a preset first rotation speed threshold within a preset sixth time duration.

Figure 6:
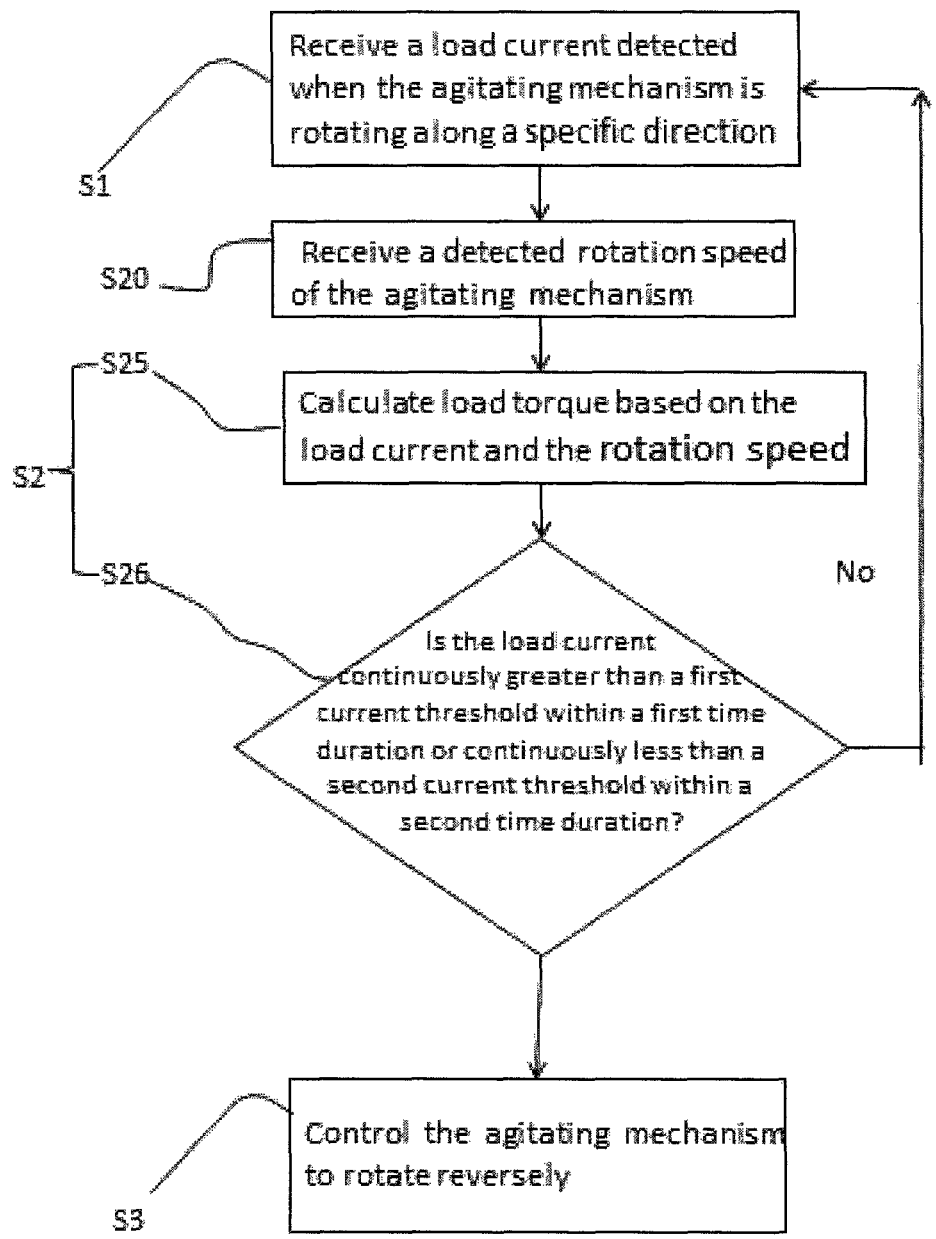
Figure 7:
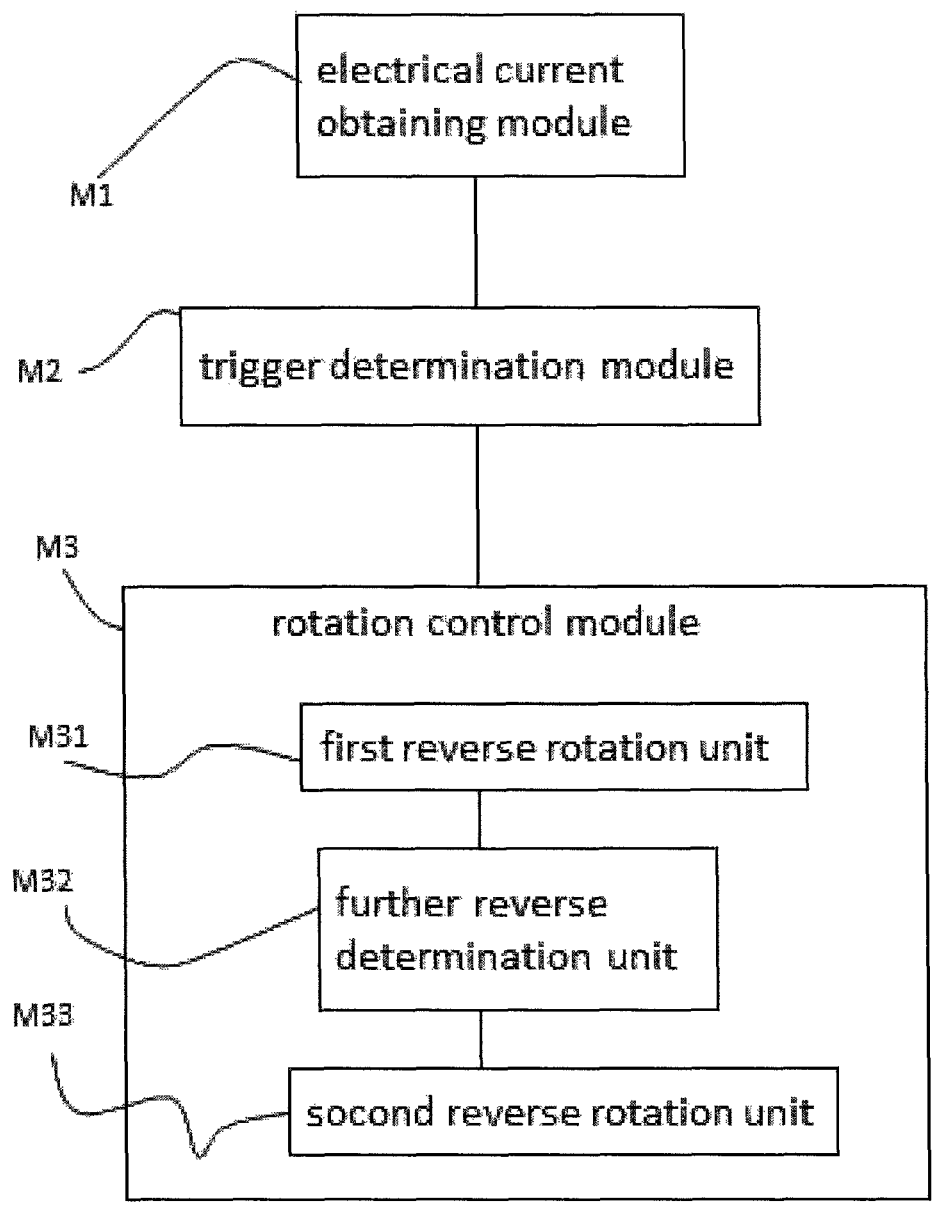
FIG. 7 through FIG. 9 are diagram of control system according to various embodiments of the present invention.
Figure 8:
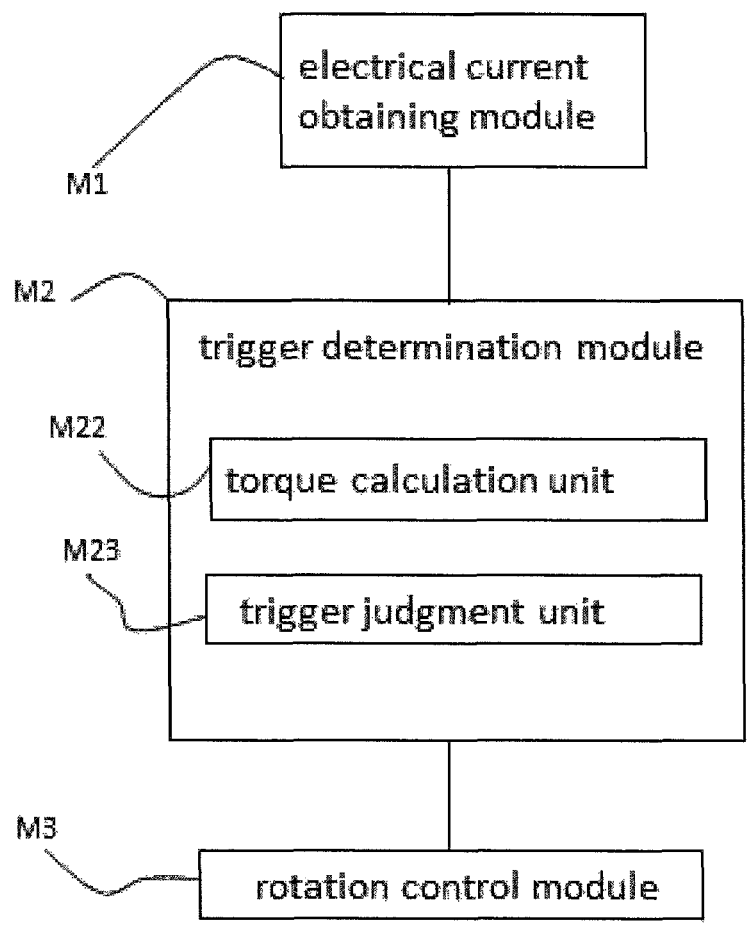
Figure 9:
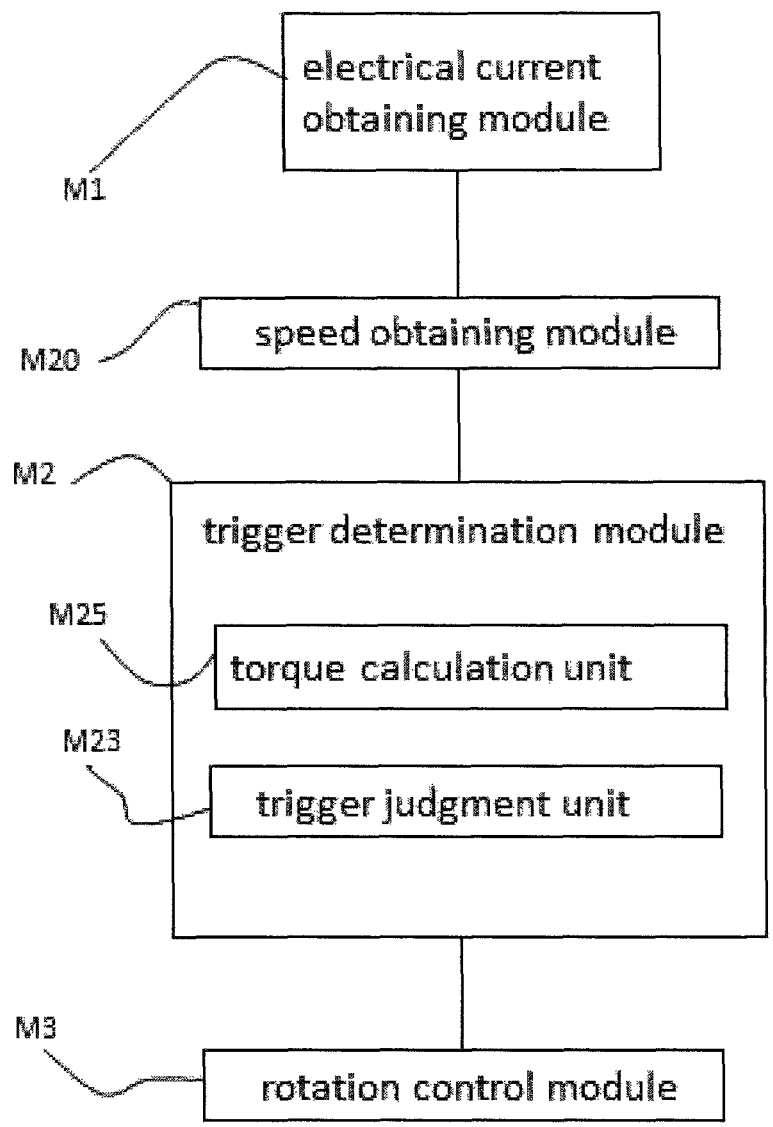

In the fourth embodiment of the control method of the present invention, whether jam occurs is determined also based on the load torque. Referring to FIG. 6, in addition to the above main technical solution, this embodiment further includes:

a speed obtaining step s20 of receiving a rotation speed of the agitating mechanism that is detected by a speed detecting apparatus;

the trigger determination step s2 including:

a torque calculation step s25 of calculating the load torque based on the load current and the rotation speed; and a trigger judgment step s26 of determining whether the rotation of the agitating mechanism meets the trigger condition based on the load torque, wherein the trigger condition is that the load torque is continuously greater than a preset third torque threshold within a preset ninth time duration, and wherein the third torque threshold is less than the rated maximum output torque of the agitating mechanism.

Based on the above main technical solution, the present invention provides the following fifth to eighth embodiments to deal with the situation that the cavity is formed in the viscous food due to the blocking of the high rotation speed agitating mechanism.

In the fifth embodiment of the control method of the present invention, whether a cavity is formed is determined based on the load current. Referring to FIG. 3, in this embodiment, the trigger determination step s2 includes a trigger judgment step s21 which refers in particular to cavity determination in which whether the rotation of the agitating mechanism meets the trigger condition based on the load current. The trigger condition is that the load current is continuously less than a preset second current threshold within a preset second time duration.

In the sixth embodiment of the control method of the present invention, whether the cavity is formed is determined based on a load torque. Referring to FIG. 4, in this embodiment, the trigger determination step s2 includes:

a torque calculation step s22 of calculating the load torque based on the load current; and a trigger judgment step s23 of determining whether the rotation of the agitating mechanism meets the trigger condition based on the load torque, wherein the trigger condition is that the load torque is continuously less than a preset second torque threshold within a preset fourth time duration.

For example, for a motor-driven agitating mechanism, the load torque is approximately equal to an electromagnetic torque when the load is balanced. In the torque calculating step, the electromagnetic torque may be calculated according to motor parameters, which is then used to estimate the load torque.

Firstly, the electromagnetic torque is calculated according to the formula $T_{em}=3/2*P_n*(\psi_f*i_q+(L_d-L_q)*i_d*i_q)$.

The load torque $T_{em} \approx T_{load}$, the load torque can therefore be estimated according to the formula $T_{load}=3/2*P_n*(\psi_f*i_q+(L_d-L_q)*i_d*i_q)$, where:

$T_{em}$ is the electromagnetic torque, $T_{load}$ is the load torque;

$i_d$ is the detected d-axis current, $i_q$ is the detected q-axis current;

$\Psi_f$ is the magnetic linkage, $L_d$ is the d-axis inductance, $L_q$ is the q-axis inductance, $P_n$ is the number of pole pairs of the motor, all of which are pre-obtained and can be preset.

In the seventh embodiment of the control method of the present invention, whether a cavity is formed is determined based on the load current and a rotation speed of the agitating mechanism. Referring to FIG. 5, in addition to the above main technical solution, this embodiment further includes:

a speed obtaining step s20 of receiving a rotation speed of the agitating mechanism that is detected by a speed detecting apparatus;

the trigger determination step s2 including a trigger judgment step s24 of determining whether the rotation of the agitating mechanism meets the trigger condition based on the load current and the rotation speed, wherein the trigger condition is that the load current is continuously greater than a preset fourth current threshold within a preset seventh time duration and the rotation speed is continuously greater than a preset second rotation speed threshold within a preset eighth time duration.

In the eighth embodiment of the control method of the present invention, whether a cavity is formed is determined based on the load torque. Referring to FIG. 6, in addition to the above main technical solution, this embodiment further includes:

a speed obtaining step s20 of receiving a rotation speed of the agitating mechanism that is detected by a speed detecting apparatus;

the trigger determination step s2 including:

a torque calculation step s25 of calculating the load torque based on the load current and the rotation speed; and a trigger judgment step s26 of determining whether the rotation of the agitating mechanism meets the trigger condition based on the load torque, wherein the trigger condition is that the load torque is continuously less than a preset fourth torque threshold within a preset tenth time duration.

For example, for the motor-driven agitating mechanism, by analyzing motor load characteristics, a load torque calculation table can be generated using finite-element analysis. In addition, Loss of machine necessarily occur in a motor during operation. Loss of machine mainly include iron losses and copper losses. Furthermore, temperature variations also affect the accuracy of the load torque. Therefore, in generating the table with this method, Loss of machine and temperature variations should be taken into account. As such, the torque calculating step is performed as follows: according to the detected load current $i_d$ and $i_q$, the detected rotation speed $\omega_r$, and preset motor losses $P_{fe}$ and temperature T, the corresponding load torque is looked up in the preset torque lookup table. This method is equally applicable in the load torque calculation of the above fourth embodiment.

The above first to fourth embodiments are specially provided for the jam situation, and the fifth to eighth embodiment are specially provided for the cavity situation. In fact, a ninth embodiment can be provided for trigger in response to the jam as well as the cavity. For example, a ninth embodiment may be obtained by combining the first embodiment and the fifth embodiment, or by combining the second embodiment and the sixth embodiment, or by combining the third embodiment and the seventh embodiment, or by combining the fourth embodiment and the eight embodiment.

In the rotation control step $S_3$ of the control method of the present invention, after the direction is reversed, the agitating mechanism can be controlled to keep the rotation direction until the next time the trigger condition is met. As such, the texture of the agitated solid content is not damaged, and the mushy content is made more homogeneous.

Preferably, the agitating blades of the agitating mechanism of the present invention can be configured as double-edged agitating blades rather than the ordinary agitating blades which have a single-sided cutting edge. Rotation of the double-edged agitating blades in either direction can cut and agitate the food, and can achieve better agitating results under the automatic direction reverse control of the present invention.

Figure 1:
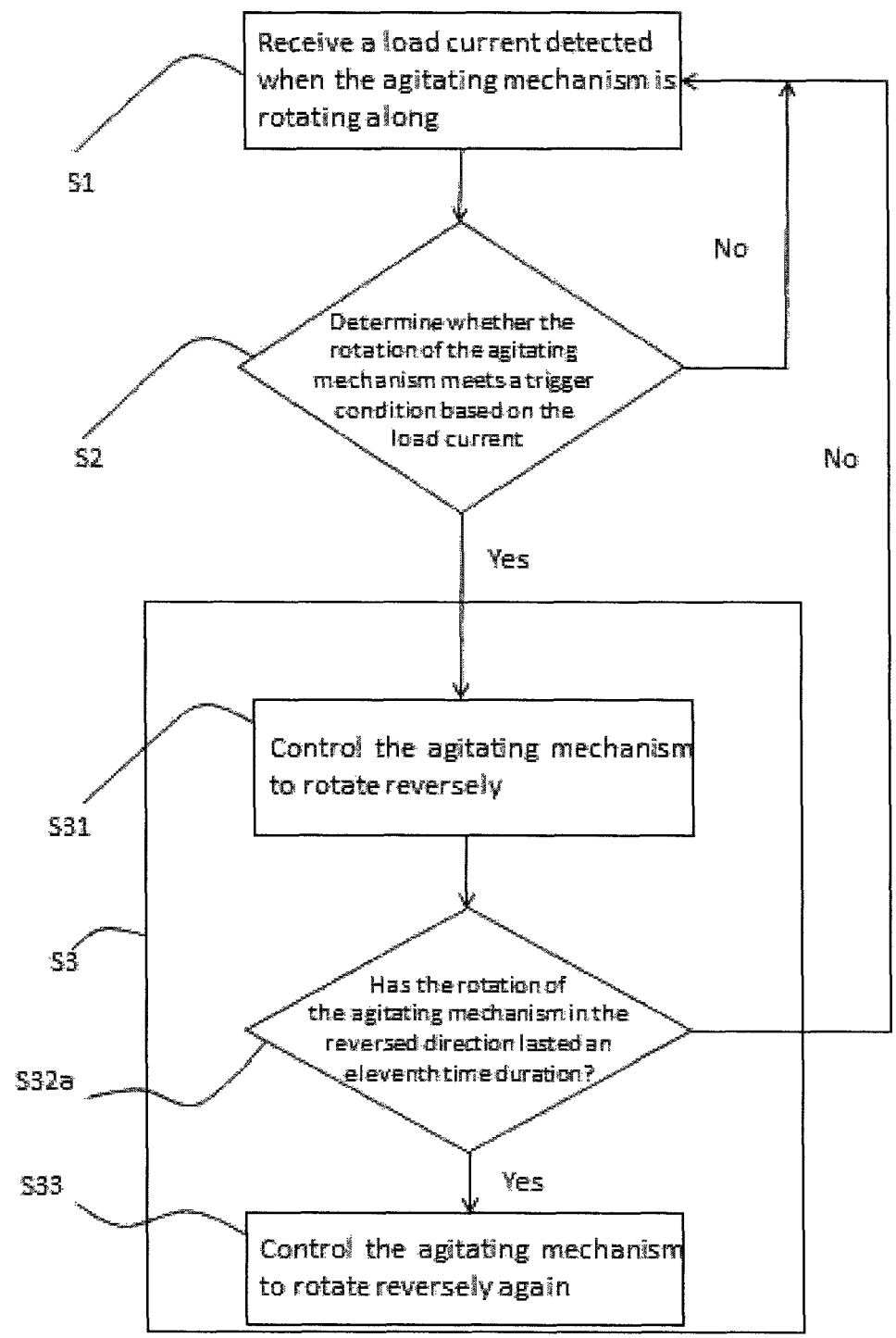
FIG. 1 through FIG. 6 are flow charts of control methods according to various embodiments of the present invention.

The present invention further provides a ninth embodiment of the control method based on any one of the above first to e embodiment. Further, as shown in FIG. 1, the rotation control step s3 includes:

a first reverse rotation step s31 of controlling the agitating mechanism to rotate reversely when the trigger condition is met;

a further reverse determination step s32a of determining whether the rotation of the agitating mechanism in the reversed direction has lasted a preset eleventh time duration from the moment the agitating mechanism starts the reverse rotation; and a second reverse step s33 of controlling the agitating mechanism to rotate reversely again if the determining result of step s32a is yes.

It should be understood that, in step s32a, if it is determined that the trigger condition is met before the preset eleventh time duration of the continuous rotation in the reverse direction ends, the method proceeds to perform step s31.

Figure 2:
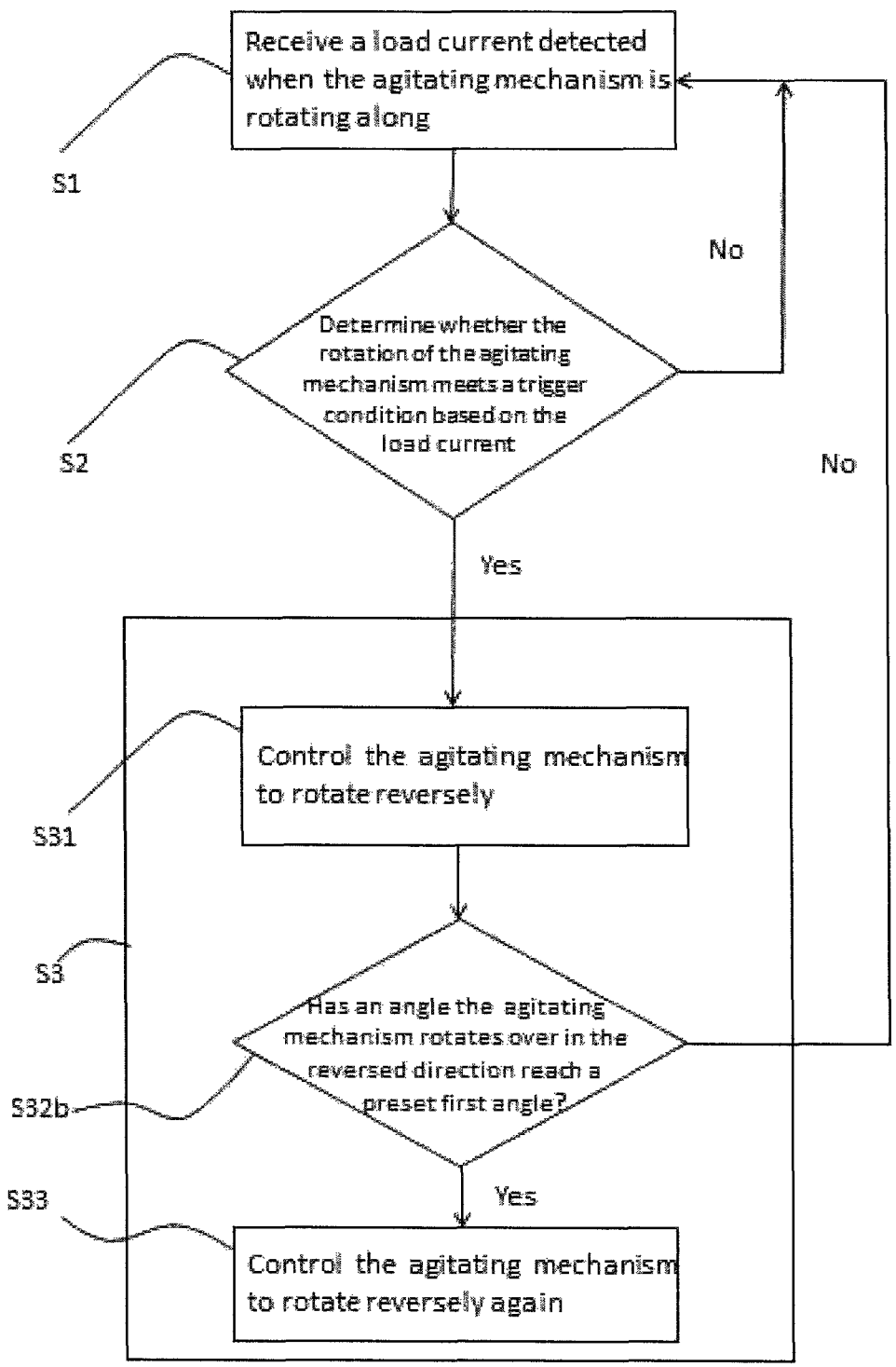

Similar to the ninth embodiment, the present invention further provides an eleventh embodiment of the control method based on any one of the above first to ninth embodiments. Further, as shown in FIG. 2, the rotation control step includes:

a first reverse rotation step s31 of controlling the agitating mechanism to rotate reversely when the trigger condition is met;

a further reverse determination step s32b of determining whether the angle the agitating mechanism rotates over in the reversed direction has reached a preset first angle from the moment the agitating mechanism starts the reverse rotation; and a second further reverse step s33 of controlling the agitating mechanism to rotate reversely again if the determining result of step s32b is yes.

It should be understood that, in step s32b, if it is determined that the trigger condition is met before the rotation angle in the reversed direction reaches the preset first angle, the method proceeds to perform step s31.

In the tenth embodiment and eleventh embodiment, after reversed, the agitating mechanism maintains the reverse rotation for a short time duration before automatic direction reverse again. That is, the agitating mechanism retreats a small step and then continues to advance in the initial rotating direction. By means of a space made by the retreat of the agitating mechanism, or by means of the space and the flow of substance as a result of the space, the position of the resisting block or the cavity is changed, and then the normal agitation continues. This can to some extent address the issue that the solid content's texture is damaged or the cavity resides in the mushy content. This control manner is more suitable for agitating mechanism with single-edged agitating blades, without the need of modifying the outer profile of the agitating blades.

The control system has multiple embodiments corresponding to the multiple embodiments of the control method. Based on the disclosure of the present invention, embodiments of the corresponding control system can be determined uniquely and unambiguously, and illuminated in drawings 7-9, respectively.

The control system in these embodiments includes an electrical current obtaining module M1 configured to receive a load current detected by a current detecting apparatus when the agitating mechanism is rotating along a specific direction, i.e. to fulfill the electrical current obtaining step s1 in the control method, a trigger determination module M2 configured to determine whether the rotation of the agitating mechanism meets a preset trigger condition based on the load current, i.e. to fulfill the trigger determination step s2 in the control method, and a rotation control module M3 configured to control the agitating mechanism to rotate in a direction opposite from the specific direction when the trigger condition is met, i.e. fulfill the rotation control step s3 in the control method. The trigger determination module M2 of the control system in some embodiments includes a torque calculation unit M22 configured to calculate a load torque based on the load current and a trigger judgment unit M23 configured to determine whether the rotation of the agitating mechanism meets the trigger condition based on the load torque. The control system in some embodiments further includes a speed obtaining module M20 configured to receive a rotation speed of the agitating mechanism that is detected by a speed detecting apparatus, the trigger determination module M2 thereof configured to determine whether the rotation of the agitating mechanism meets a preset trigger condition based on both the load current and the rotation speed of the agitating mechanism. The trigger determination module M2 of the control system in some embodiments includes a torque calculation unit M25 configured to calculate a load torque based on the load current and the rotation speed the agitating mechanism.

The rotation control module M3 of the control system in some embodiments includes a first reverse rotation unit M31 configured to control the agitating mechanism to rotate reversely when the trigger condition is met, a further reverse determination unit M32 configured to determine whether the rotation of the agitating mechanism in the reversed direction has lasted a preset eleventh time duration from the moment the agitating mechanism starts the reverse rotation, or determining whether an angle the agitating mechanism rotates over in the reversed direction has reached a preset first angle from the moment the agitating mechanism starts the reverse rotation, and a second reverse unit M33 configured to control the agitating mechanism to rotate reversely again if the determining result of the further reverse determination unit is yes.

The control system in some embodiments further includes a speed obtaining module M20 configured to receive a rotation speed of the agitating mechanism that is detected by a speed detecting apparatus.

Although the invention is described with reference to one or more preferred embodiments, it should be appreciated by those skilled in the art that various modifications are possible. Therefore, the scope of the invention is to be determined by reference to the claims that follow.

The invention claimed is:

1. A control method for an agitating mechanism, comprising:
   an electrical current obtaining step of receiving a load current detected by a current detecting apparatus when the agitating mechanism is rotating along a specific direction;
   a trigger determination step of determining whether the rotation of the agitating mechanism meets a preset trigger condition based on the load current; and
   a rotation control step of controlling the agitating mechanism to rotate in a direction opposite from the specific direction when the trigger condition is met,
   wherein the trigger determination step comprises a torque calculation step of calculating a load torque based on the load current, the trigger condition is that the load torque is continuously less than a preset torque threshold within a preset time duration, the preset torque threshold is less than a rated maximum output torque of the agitating mechanism.

2. The control method of claim 1, wherein the agitating mechanism is driven by a motor, the torque calculation step calculates the load torque according to the formula $T_{load}=3/2*P_n*(\psi_f*i_d+(L_d-L_q)*i_d*i_q)$,
   where,
   $T_{load}$ is the load torque;
   $i_d$ is a detected d-axis current, $i_q$ is a detected q-axis current;
   $\psi_f$ is the magnetic linkage, $L_d$ is a d-axis inductance, $L_q$ is a q-axis inductance, $P_n$ is the number of pole pairs of the motor, all of which are pre-obtained and are preset.

3. A control method for an agitating mechanism, comprising:
   an electrical current obtaining step of receiving a load current detected by a current detecting apparatus when the agitating mechanism is rotating along a specific direction;
   a trigger determination step of determining whether the rotation of the agitating mechanism meets a preset trigger condition based on the load current;
   a speed obtaining step of receiving a rotation speed of the agitating mechanism that is detected by a speed detecting apparatus; and
   a rotation control step of controlling the agitating mechanism to rotate in a direction opposite from the specific direction when the trigger condition is met;
   wherein the trigger determination step comprises a torque calculation step of calculating a load torque based on the load current and the rotation speed; the trigger condition is that the load torque is continuously less than a preset torque threshold within a preset time duration.

4. The control method of claim 3, wherein the agitating mechanism is driven by a motor; at the torque calculating step, the corresponding load torque is looked up in a preset torque lookup table according to the detected load current $i_d$ and $i_q$, the detected rotation speed $\omega_r$, and preset motor losses $P_{fe}$ and temperature T.

5. A control system or an agitating mechanism, comprising:
   an electrical current obtaining module configured to receive a load current detected by a current detecting apparatus when the agitating mechanism is rotating along a specific direction;
   a trigger determination module configured to determine whether the rotation of the agitating mechanism meets a preset trigger condition based on the load current; and
   a rotation control module configured to control the agitating mechanism to rotate in a direction opposite from the specific direction when the trigger condition is met;
   wherein the trigger determination module comprising, a torque calculation unit configured to calculate a load torque based on the load current; and a trigger judgment unit configured to determine whether the rotation of the agitating mechanism meets the trigger condition based on the load torque, the trigger condition is that the load torque is continuously less than a preset torque threshold within a preset time duration.

6. The control system of claim 5, wherein the agitating mechanism is driven by a motor, the torque calculation unit calculates the load torque according to the formula $T_{load}=3/2*P_n*(\psi_f*i_d+(L_d-L_q)*i_d*i_q)$,
   where,
   $T_{load}$ is the load torque;
   $i_d$ is a detected d-axis current, $i_q$ is a detected q-axis current;
   $\psi_f$ is the magnetic linkage, $L_d$ is a d-axis inductance, $L_q$ is a q-axis inductance, $P_n$ is the number of pole pairs of the motor, all of which are pre-obtained and are preset in the torque calculation unit.

7. A control system for an agitating mechanism, comprising:
   an electrical current obtaining module configured to receive a load current detected by a current detecting apparatus when the agitating mechanism is rotating along a specific direction;
   a trigger determination module configured to detettitine whether the rotation of the agitating mechanism meets a preset trigger condition based on the load current;

a speed obtaining module configured to receive a rotation speed of the agitating mechanism that is detected by a speed detecting apparatus; and a rotation control module configured to control the agitating mechanism to rotate in a direction opposite from the specific direction when the trigger condition is met;

wherein the trigger condition is that the load current is continuously less than a preset current threshold within a preset time duration and the rotation speed is continuously greater than a preset rotation speed threshold within another preset time duration.

8. A control system for an agitating mechanism, comprising:

an electrical current obtaining module configured to receive a load current detected by a current detecting apparatus when the agitating mechanism is rotating along a specific direction;

a trigger determination module configured to determine whether the rotation of the agitating mechanism meets a preset trigger condition based on the load current;

a speed obtaining module configured to receive a rotation speed of the agitating mechanism that is detected by a speed detecting apparatus; and a rotation control module configured to control the agitating mechanism to rotate in a direction opposite from the specific direction when the trigger condition is met;

wherein the trigger determination module comprises a torque calculation unit configured to calculate a load torque based on the load current and the rotation speed; and a trigger judgment unit configured to determine whether the rotation of the agitating mechanism meets the trigger condition based on the load torque;

wherein the trigger condition is that the load torque is continuously less than a preset torque threshold within a preset time duration.

9. The control system of claim 8, wherein the agitating mechanism is driven by a motor, and the torque calculation unit is configured to look up in a preset torque lookup table for the corresponding load torque according to the detected load current $i_d$ and $i_q$, the detected rotation speed $\omega_r$, and preset motor losses $P_{fe}$ and temperature T.

* * * * *